United States Patent
Watanabe et al.

(10) Patent No.: US 9,329,603 B2
(45) Date of Patent: May 3, 2016

(54) VACUUM PRESSURE REGULATION SYSTEM

(71) Applicant: SMC Corporation, Chiyoda-ku (JP)

(72) Inventors: Tadao Watanabe, Moriya (JP); Yu Hirabayashi, Yachiyo (JP)

(73) Assignee: SMC CORPORATION, Chiyoda-ku (JP)

( * ) Notice: Subject to any disclaimer, the term of this patent is extended or adjusted under 35 U.S.C. 154(b) by 260 days.

(21) Appl. No.: 14/054,965

(22) Filed: Oct. 16, 2013

(65) Prior Publication Data

US 2014/0130907 A1 May 15, 2014

(30) Foreign Application Priority Data

Nov. 13, 2012 (JP) ................................. 2012-249327

(51) Int. Cl.
*G05D 16/20* (2006.01)

(52) U.S. Cl.
CPC ........ *G05D 16/2093* (2013.01); *G05D 16/2086* (2013.01); *Y10T 137/7761* (2015.04)

(58) Field of Classification Search
CPC ................... Y10T 137/7761; Y10T 137/7762; Y10T 137/7764; Y10T 137/7765; Y10T 137/7766; Y10T 137/7767; Y10T 137/7768; Y10T 137/7769; Y10T 137/777; G05D 16/2086; G05D 16/2093
USPC ........... 137/487.5, 488, 489, 490, 481, 489.3, 137/492, 492.5
See application file for complete search history.

(56) References Cited

U.S. PATENT DOCUMENTS

| | | | | | |
|---|---|---|---|---|---|
| 4,059,128 | A | * | 11/1977 | Heske | G05D 16/2093 137/487.5 |
| 4,720,807 | A | * | 1/1988 | Ferran | G05D 16/20 137/487.5 |
| 5,357,996 | A | * | 10/1994 | Ioannides | G05D 16/2033 137/12 |
| 5,758,680 | A | * | 6/1998 | Kaveh | G05D 16/2013 118/692 |
| 5,803,107 | A | * | 9/1998 | Kaveh | G05D 16/202 118/692 |
| 5,848,608 | A | * | 12/1998 | Ishigaki | F16K 31/1225 137/599.16 |
| 5,927,334 | A | * | 7/1999 | Ishigaki | F16K 11/044 137/596.17 |

(Continued)

FOREIGN PATENT DOCUMENTS

| | | |
|---|---|---|
| JP | 2006-18767 | 1/2006 |
| JP | 2007-146908 | 6/2007 |

*Primary Examiner* — William McCalister
(74) *Attorney, Agent, or Firm* — Oblon, McClelland, Maier & Neustadt, L.L.P.

(57) ABSTRACT

A valve main body including a valve member that opens and closes a valve seat is associated with a fluid pressure driving unit including a pressure-receiving member (piston) that drives the valve member, a valve aperture adjusting unit that sets the aperture of the valve member, an electromagnetic valve unit that supplies and discharges a pilot fluid to and from the fluid pressure driving unit, and a controller that controls the aperture of the valve member. The controller controls the aperture of the valve member by controlling the position of the pressure-receiving member, such that the vacuum chamber attains a predetermined target pressure, and monitors a difference between an actual pressure in the vacuum chamber obtained from the pressure sensor and the target pressure, and announces abnormality in the case where the difference deviates from a tolerance range.

7 Claims, 5 Drawing Sheets

(56) References Cited

U.S. PATENT DOCUMENTS

| | | | |
|---|---|---|---|
| 6,814,338 B2* | 11/2004 | Kajitani | F16K 31/1221 137/630 |
| 2001/0023709 A1* | 9/2001 | Furutate | F16K 31/1221 137/556 |
| 2002/0027211 A1* | 3/2002 | Kajitani | F16K 31/1221 251/63.6 |
| 2002/0033461 A1* | 3/2002 | Kajitani | F16K 1/38 251/63.6 |
| 2003/0098066 A1* | 5/2003 | Kanzaka | F16K 49/002 137/334 |
| 2003/0116193 A1* | 6/2003 | Fukuda | F16K 49/002 137/341 |
| 2003/0178064 A1* | 9/2003 | Fukuda | F16K 49/002 137/341 |
| 2004/0089344 A1* | 5/2004 | Kanzaka | F16K 31/122 137/341 |
| 2004/0232369 A1* | 11/2004 | Kajitani | F16K 31/1221 251/122 |
| 2004/0238039 A1* | 12/2004 | Friedrichs | B64F 5/0045 137/487.5 |
| 2004/0244837 A1* | 12/2004 | Nawata | G05D 7/0635 137/487.5 |
| 2005/0045235 A1* | 3/2005 | Kajitani | F16K 41/10 137/601.14 |
| 2006/0021656 A1* | 2/2006 | Kajitani | G05D 16/202 137/487.5 |
| 2006/0237068 A1* | 10/2006 | Miyazoe | F15B 13/0431 137/596.16 |
| 2010/0252121 A1* | 10/2010 | Saito | G05D 16/2013 137/14 |

* cited by examiner

VACUUM PRESSURE REGULATION SYSTEM

TECHNICAL FIELD

The present invention relates to a vacuum pressure regulation system to be used for depressurizing a vacuum chamber for chemical reaction in a physicochemical apparatus or the like.

BACKGROUND ART

In a manufacturing apparatus of a semiconductor, for example, physicochemical treatment is performed in a vacuum chamber. In this process a vacuum pressure regulating valve is employed for opening and closing a flow path connecting between the vacuum chamber and a vacuum pump that depressurizes the vacuum chamber and, normally, a vacuum pressure regulation system is constituted including a controller that gradually increases the aperture of the valve to prevent particles from being dispersed inside the vacuum chamber.

The vacuum pressure regulating valve includes, for example as disclosed in Patent Literature 1, Japanese Unexamined Patent Application Publication No. 2007-146908, a valve main body including, inside a valve housing in which a valve seat is provided in a flow path connecting between two main ports respectively connected to the vacuum chamber and the vacuum pump, a valve member configured to abut and separate from the valve seat so as to close and open the flow path, a valve shaft connected to the valve member and extending in the axial direction thereof out of the valve housing such that the distal end portion reaches a fluid pressure driving unit, and a return spring that biases the valve member in the direction to close the valve seat. The fluid pressure driving unit includes a pressure-receiving chamber configured to generate a pilot fluid pressure to be exerted on the valve member in the direction to open the flow path, including a pressure-receiving member attached to the distal end portion of the valve shaft, and connected to a pilot port for supplying and discharging the pilot fluid to and from the pressure-receiving chamber. The controller controls the position of the pressure-receiving member to adjust the aperture of the valve member, to thereby regulate the vacuum pressure in the vacuum chamber so as to slowly reduce the pressure.

With the vacuum pressure regulation system thus configured, however, a valve aperture preset in advance may fail to maintain the desired exhaust velocity in the case where abnormality such as leak in the vacuum chamber or other points in the vacuum system or clogging of a piping takes place, in which case the controller executes a feedback control so as to increase the valve aperture on the basis of comparison between an output of a pressure sensor that detects the pressure in the vacuum chamber and a signal of a control command such as an externally specified pressure or transition of the exhaust velocity. Nevertheless, the pressure in the vacuum chamber is unable to be lowered while the abnormality remains unremoved, and therefore the valve is finally set to the maximum aperture by the feedback control, still failing to attain the desired exhaust velocity. The abnormality is unable to be detected at an early stage unless the controller is provided with an abnormality detection device. If the vacuum pump continues to aspirate gas of a high temperature from the vacuum chamber while the vacuum pressure regulating valve remains fully opened, the piping may be damaged and even the vacuum pump may be broken down, in which case an enormous cost and time is required for restoring the system.

To avoid the foregoing problem, the vacuum pressure control system according to Patent Literature 2, Japanese Unexamined Patent Application Publication No. 2006-18767, is configured to decide that abnormality has occurred in the case where an output of a pressure sensor provided in a vacuum container is larger than a predetermined value when the valve is set to a predetermined aperture, thus to detect the abnormality of the system at an early stage.

However, the decision of the abnormality made by the vacuum pressure control system according to Patent Literature 2 is with respect to a pinpoint in the transition of the valve aperture, and does not lead to the conclusion whether the evacuation is being normally and continuously performed. Moreover, the pinpoint aperture and setting of a pressure correlated thereto involve various experimental factors, and therefore it is difficult to set an appropriate value through a simple process, and further the transition of the aperture with time is unable to be ascertained.

SUMMARY OF INVENTION

A technical object of the present invention is to provide a vacuum pressure regulation system capable of easily and securely deciding and announcing abnormality that may occur with the lapse of time, the system including a controller configured to control the aperture of a vacuum pressure regulating valve, to sequentially detect a difference between an actual pressure in a vacuum chamber and a target pressure thereby detecting the abnormality, in order to prevent failure to attain a desired exhaust velocity in the vacuum chamber because of the abnormality in the system when the vacuum pressure regulating valve is fully opened, and to announce the abnormality of the system when it is decided, on the basis of the detected difference, that the desired exhaust velocity is difficult to maintain with the valve aperture currently set.

The vacuum pressure regulation system according to PTL 1 includes, like an embodiment of the present invention to be subsequently described, a valve aperture adjusting unit 3 that sets the aperture of the valve member 15 by driving a piston 16 in a fluid pressure driving unit 2 that opens and closes the valve member 15. When an end portion of an adjuster 41 is made to oppose or abut the piston 16, the adjuster 41 is positioned by converting the rotary motion of an electric motor 45 in the valve aperture adjusting unit 3 into a linear motion, in which process the adjuster 41 and the piston 16 are abutted to each other with a generally constant force, by offsetting acting force of a return spring 23 and acting force based on the pressure in the vacuum chamber exerted on the valve member 15 with a pilot air pressure exerted on the piston 16, thereby allowing a small electric motor without a sufficient driving force to cope with the acting force to be employed.

Whereas the foregoing configuration is effective for reduction in size of the valve aperture adjusting unit 3 and improvement in responsiveness thereof since the output of the electric motor 45 that drives the adjuster 41 can be reduced, the present inventor has confirmed that the mentioned configuration allows the exhaust velocity to be adjusted to a value quite close to a preset evacuation velocity, thus to allow the exhaust gas in the vacuum chamber to be smoothly and generally linearly reduced. More specifically, FIG. 5 shows monitoring results (exhaust gas characteristics), in which the right vertical coordinate axis represents the exhaust velocity of the evacuation and the left vertical coordinate axis represents the pressure in the vacuum chamber at the preset velocity specified below under the foregoing configuration. Curved lines A1 and A2 in FIG. 5 respectively represent the monitoring results of the exhaust velocity in the case where the preset velocity of the exhaust gas was 1 Torr/s and 2 Torr/s, and curved lines B1 and B2 respectively represent the monitoring results of the pressure transition in the vacuum chamber in the case where the preset velocity of the exhaust gas was 1 Torr/s and 2 Torr/s. These monitoring results show that the foregoing configuration allows the exhaust velocity to be relatively accurately controlled in a generally constant range, thus to allow the pressure in the vacuum chamber to be generally linearly reduced.

Another technical object of the present invention is to provide, on the basis of the aforementioned finding, a vacuum pressure regulation system capable of accurately announcing abnormality with a highly simplified structure, in which the vacuum pressure regulating valve includes a valve aperture adjusting unit that sets by using the electric motor the position of the adjuster for setting the aperture of the valve member, to thereby control the exhaust velocity relatively accurately, in other words in a generally constant range according to the preset evacuation velocity, and a tolerance range (for example, ±50% of the preset velocity) is specified with respect to the preset value of the exhaust velocity according to the performance level of the valve aperture adjusting unit, so that abnormality is detected in the case where the exhaust velocity deviates from the tolerance range, or where another value such as the valve aperture deviates from the corresponding tolerance range.

Accordingly, the present invention provides a vacuum pressure regulation system that includes a vacuum pressure regulating valve including (i) a valve main body including, inside a valve housing in which a valve seat is provided in a flow path connecting between a vacuum chamber and a vacuum pump, a valve member configured to abut and separate from the valve seat so as to close and open the flow path, a valve shaft connected to the valve member and extending in the axial direction thereof from the valve housing such that the distal end portion reaches a fluid pressure driving unit, and a return spring that biases the valve member in a direction to close the valve seat, (ii) a pressure-receiving chamber configured to generate a fluid pressure acting in the direction to open the valve member and including a pressure-receiving member attached to the distal end portion of the valve shaft, and (iii) the fluid pressure driving unit including a pilot port for supplying and discharging a pilot fluid to and from the pressure-receiving chamber, the system also including an electromagnetic valve unit connected to the vacuum pressure regulating valve and configured to supply and discharge the pilot fluid through the pilot port of the pressure-receiving chamber, and a controller that controls operation of the electromagnetic valve unit on the basis of an output signal from a position sensor that detects a position of the valve member, an output signal from a pressure sensor in the vacuum chamber that detects the vacuum pressure, and a control command inputted from outside, the controller having the following functions.

The controller possesses a preset value of pressure in the vacuum chamber evacuated by the vacuum pump and velocity information of the evacuation, and executes feedback control of the aperture of the valve member by controlling the position of the pressure-receiving member, such that the vacuum chamber attains a target pressure determined on the basis of the preset value of pressure and the evacuation velocity information in each period of the evacuation control, and detects a difference between an actual pressure in the vacuum chamber obtained by the pressure sensor and the target pressure in each control period, to thereby announce abnormality in the case where the difference deviates from a tolerance range specified with respect to the target pressure.

In a preferred embodiment of the vacuum pressure regulation system according to the present invention, the controller may be configured to start a periodical action for the evacuation control after a monitoring period for confirming pressure transition in the vacuum chamber caused by the evacuation of the vacuum chamber has elapsed. The controller may also possess preset velocity and preset acceleration as part of the velocity information of the evacuation by the vacuum pump, and be configured to slowly increase the transition velocity of the vacuum pressure in each control period according to the preset acceleration immediately after the start of the periodical action for the evacuation control, and to maintain the preset velocity after the transition velocity of the vacuum pressure reaches the preset velocity through an acceleration control period in which the evacuation of the vacuum chamber is gently started.

In another preferred embodiment of the vacuum pressure regulation system according to the present invention, the vacuum pressure regulating valve may further include a valve aperture adjusting unit including an adjuster to be made to abut the back face of the pressure-receiving member to determine a stopping position of the pressure-receiving member, and an electric motor that steplessly moves the adjuster back and forth to a desired position by using a rotary-to-linear motion conversion mechanism, and the controller may be configured to control the position of the adjuster by supplying a necessary driving current to the electric motor according to the control command, and controlling the operation of the electric motor and the electromagnetic valve unit such that the position of the adjuster determined by an output of an encoder that detects a rotation amount of the electric motor agrees with a designated position.

In still another preferred embodiment of the vacuum pressure regulation system according to the present invention, the electric motor may include a load detector that detects a rotational load of the electric motor, and the controller may be configured to perform a pilot fluid pressure control including detecting, when controlling the position of the adjuster, whether the rotational load of the electric motor according to a pressing force between the adjuster and the pressure-receiving member obtained from the output of the load detector is between a predetermined upper limit and a lower limit, and outputting a control signal to the electromagnetic valve unit so as to supply a pilot fluid pressure to the pressure-receiving chamber for pressing the pressure-receiving member against the adjuster with a force between the upper and the lower limits in the case where the rotational load deviates from the range between the upper and the lower limits, thereby allowing the electric motor to operate while keeping the pressure-receiving member and the adjuster pressed against each other with the force between the upper and the lower limits. In this case, it is preferable to determine the pilot fluid pressure in the pilot fluid pressure control so as to generate a pressing force corresponding to the total sum of the acting force of the return spring, the acting force based on the pressure in the vacuum chamber exerted on the valve member, and the biasing force constantly exerted between the adjuster and the pressure-receiving member.

Further, in the vacuum pressure regulation system according to the present invention, the controller may possess, as simple substitution for the pilot fluid pressure control, predetermined values of the acting force of the return spring, the acting force based on the pressure in the vacuum chamber exerted on the valve member, and the biasing force constantly exerted between the adjuster and the pressure-receiving member, the values being functionized on the basis of a correlation with the position of the pressure-receiving member, and the controller may be configured to output, when controlling the position of the adjuster, a control signal to the electromagnetic valve unit so as to cause the electromagnetic valve unit to output the fluid pressure according to the position of the pressure-receiving member obtained through the functionization, to the pressure-receiving chamber of the fluid pressure driving unit as pilot fluid pressure.

In the thus-configured vacuum pressure regulation system according to the present invention, the controller possesses the preset value of pressure and the velocity information of the evacuation with respect to the vacuum pressure in the vacuum chamber, and when the controller supplies the driving current to the electric motor to drive the adjuster to a predetermined position the electric motor is driven, and the associated encoder feeds back the signal representing the position of the adjuster to the controller, so that a servo mechanism stops the electric motor always at a designated position.

The controller also outputs, in order to operate the pressure-receiving member such as the piston in the fluid pressure driving unit, while keeping the pressure-receiving member and the adjuster that determines the position pressed against each other with a generally constant force, a control signal to the electromagnetic valve unit so as to supply the pilot fluid pressure that generates the force that can cope with the [acting force of the return spring+acting force based on the pressure in the vacuum chamber exerted on the valve member+biasing force constantly exerted between the adjuster and the pressure-receiving member] to the pressure-receiving chamber, according to the position of the pressure-receiving member determined by the position of the adjuster.

Accordingly, the pressure-receiving member is driven by the pilot fluid pressure to the position where the pressure-receiving member is pressed against the adjuster with a generally constant force, to be constantly pressed against the adjuster with the biasing force. Such a situation allows the acting force of the return spring and the acting force based on the pressure in the vacuum chamber exerted on the valve member to be offset with the pilot fluid pressure exerted on the pressure-receiving member, thereby exempting the electric motor from having a driving force that can cope with the mentioned acting forces and thus enabling a small-sized electric motor having a low output power to be employed.

In addition, since the controller controls the operation of the pressure-receiving member while keeping the pressure-receiving member and the adjuster pressed against each other with a generally constant biasing force, the encoder attached to the electric motor to detect the rotation amount thereof can serve as the position sensor that detects the position of the pressure-receiving member that defines the valve aperture.

Further, in the foregoing vacuum pressure regulation system, although the pressing force of the pressure-receiving member exerted on the adjuster varies depending on the pressure of the pilot fluid supplied to the pressure-receiving chamber of the fluid pressure driving unit, when the electric motor is driven the rotational load, detected by the load detector of the electric motor (detector of the driving current), varies according to the pressing force, and therefore the controller detects whether the driving current supplied to the electric motor is between the predetermined upper limit and the lower limit, to thereby output a signal to operate the electromagnetic valve unit in the case where the driving current deviates from the range between the upper and lower limits. Thus, the electromagnetic valve unit supplies the pilot fluid pressure that generates the force that can cope with the [acting force of the return spring+acting force based on the pressure in the vacuum chamber exerted on the valve member+biasing force constantly exerted between the adjuster and the pressure-receiving member] to the pressure-receiving chamber, so that the pressure-receiving member and the adjuster are pressed against each other with a generally constant force.

Further, as simple substitution for the pilot fluid pressure control, the acting force of the return spring and the acting force based on the pressure in the vacuum chamber exerted on the valve member may be measured in advance, and these values may be functionized on the basis of the correlation between the position of the pressure-receiving member and the acting forces and stored in the controller. Such an arrangement allows the pilot fluid pressure supplied to the pressure-receiving chamber to be uniquely determined according to the position of the valve member, which eliminates the need to detect whether the driving current supplied to the electric motor is between the predetermined upper limit and the lower limit.

Still further, even when the aperture of the vacuum pressure regulating valve becomes uncontrollable owing to some kind of abnormality in the system, the controller that controls the aperture of the vacuum pressure regulating valve sequentially detects the increase in difference between the actual pressure in the vacuum chamber and the target pressure, and announces, upon deciding that the difference has deviated from a tolerance range and the desired exhaust velocity has turned difficult to maintain, the occurrence of the abnormality in the exhaust velocity in the vacuum chamber or the aperture of the valve member. Thus, the controller constantly monitors whether abnormality is taking place with the simple configuration, to immediately announce the occurrence of the abnormality.

With the vacuum pressure regulation system according to the present invention described above in details, the controller detects abnormality with the simple configuration in the case where the vacuum pressure regulating valve is fully opened owing to some kind of abnormality in the system, and announces the occurrence of the abnormality in the system.

In particular, the exhaust velocity can be relatively accurately controlled according to the preset evacuation velocity, by providing the vacuum pressure regulating valve with the valve aperture adjusting unit that sets the position of the adjuster by using the electric motor on the basis of the finding that the exhaust velocity can be maintained in a generally constant range through the pilot fluid pressure control with the electromagnetic valve unit, which maintains the rotational load of the electric motor based on the pressing force between the pressure-receiving member and the adjuster in the range between the predetermined upper limit and the lower limit. Accordingly, the abnormality can be accurately announced with a highly simplified structure by specifying a tolerance range with respect to the preset value of the exhaust velocity according to the performance level of the valve aperture adjusting unit, and deciding the abnormality in the case where the exhaust velocity deviates from the tolerance range. Further, the abnormality can also be accurately announced with a highly simplified structure, by uniquely determining the pilot fluid pressure to be supplied to the pressure-receiving chamber according to the position of the valve member, on the basis of the information of the acting force of the return spring and so forth functionized in advance.

DESCRIPTION OF EMBODIMENT

Figure 1:
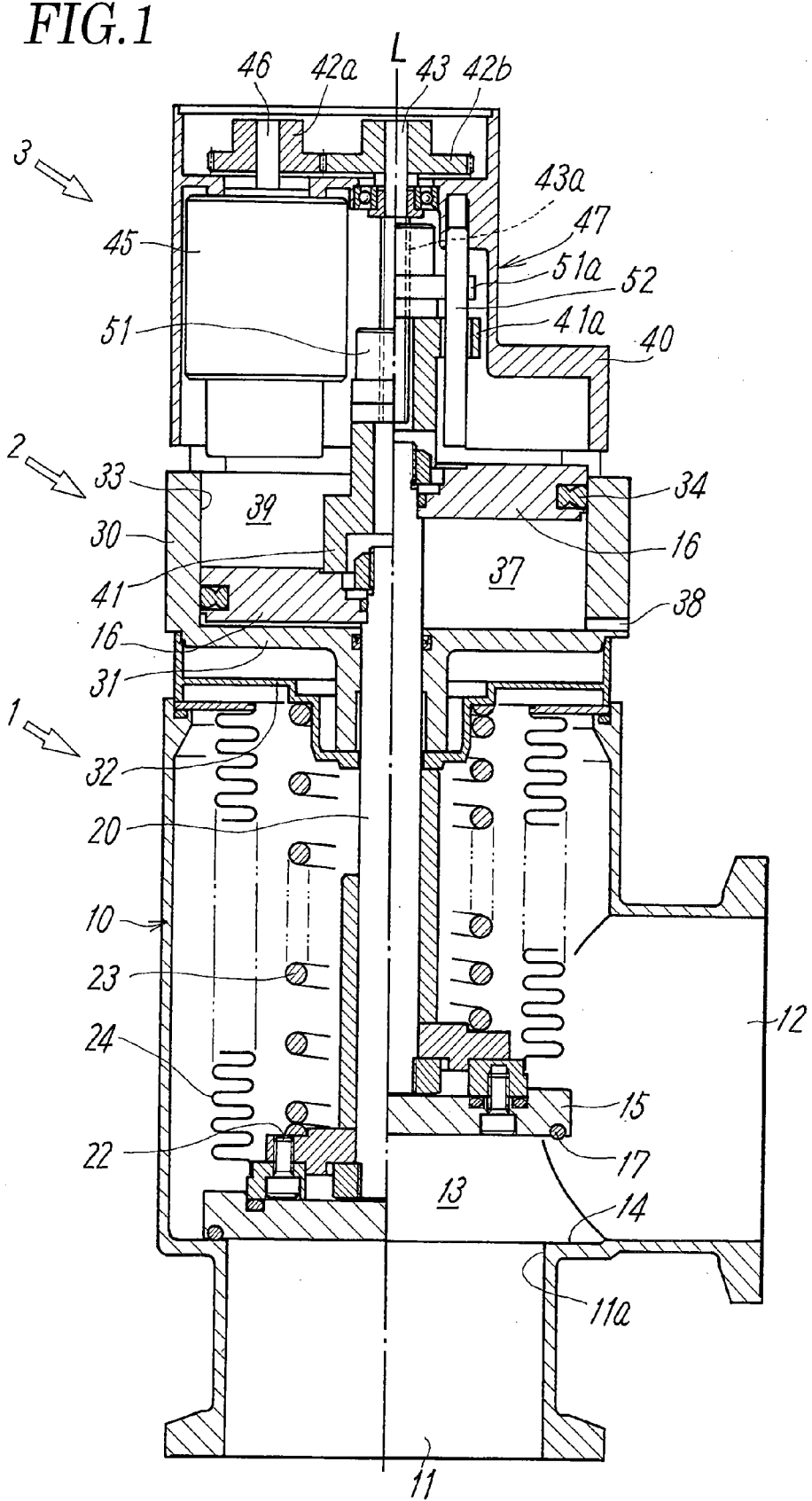
FIG. 1 is a cross-sectional view showing a configuration of a vacuum pressure regulating valve employed in a vacuum pressure regulation system according to the present invention, the left half showing a state in which a valve member is closed, and the right half showing a state in which the valve member is open.
Figure 2:
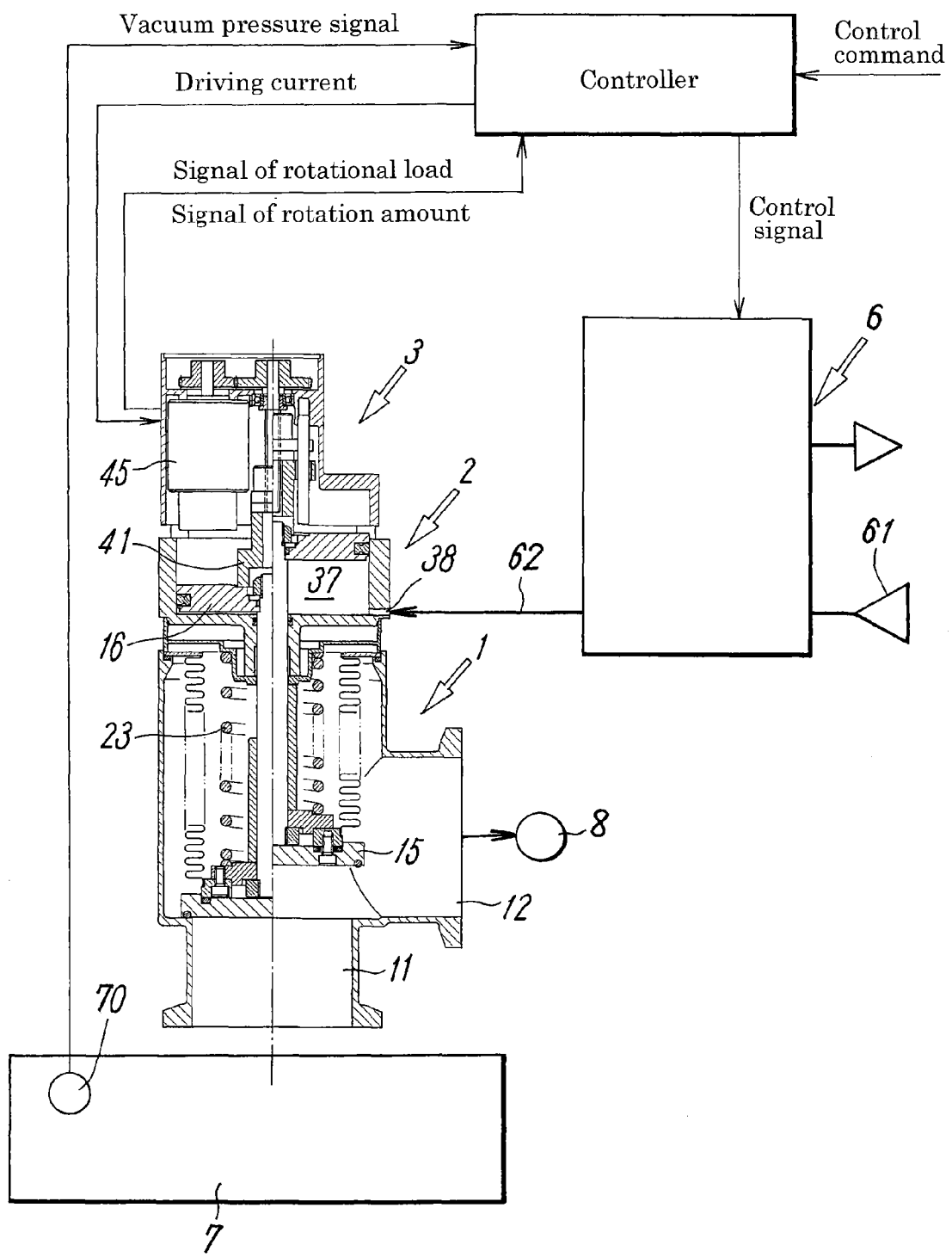
FIG. 2 is a schematic diagram showing a configuration of the vacuum pressure regulation system according to the present invention.

FIG. 1 illustrates a typical embodiment of a vacuum pressure regulating valve employed in a vacuum pressure regulation system according to the present invention, and FIG. 2 illustrates a general configuration of the vacuum pressure regulation system including the vacuum pressure regulating valve.

The vacuum pressure regulating valve includes a valve main body 1 having a valve member 15 that opens and closes a flow path 13 between a first and a second main ports 11, 12, a fluid pressure driving unit 2 having a piston (pressure-receiving member) 16 that opens and closes the valve member 15, and a valve aperture adjusting unit 3 that sets the aperture of the valve member 15. The vacuum pressure regulating valve is connected, as shown in FIG. 2, to an electromagnetic valve unit 6 that supplies and discharges a pilot fluid to and from the fluid pressure driving unit 2, and to a controller that receives a control command and information of a load of an electric motor 45 to be described later and a position of the piston 16, and controls the aperture of the valve member 15 on the basis of those inputs.

More specifically, a hollow valve housing 10 of the valve main body 1 includes, as shown in FIGS. 1 and 2, the first main port 11 to be connected to a vacuum chamber 7 and the second main port 12 to be connected to a vacuum pump 8. Inside the valve housing 10, the flow path 13 is provided between the main ports 11, 12, and a valve seat 14 is provided around an opening 11a of the first main port 11 communicating with the flow path 13.

The valve housing 10 includes the valve member 15 of a poppet type configured to abut and separate from the valve seat 14 so as to close and open the flow path 13 and disposed concentrically with the valve seat 14, and a valve seal member 17 formed of a rubber elastic material is attached to the outer periphery of the valve member 15 so as to abut and separate from the valve seat 14. A valve shaft 20 is attached to the back face of the valve member 15. The valve shaft 20 extends through inside the valve housing 10 along a central axial line L, and penetrates through a partition wall 31 of a cylinder housing 30 concentrically connected to the end portion of the valve housing 10 opposite the first main port 11. The distal end portion of the valve shaft 20 intrudes in the fluid pressure driving unit 2 and is connected to the piston 16 in the cylinder housing 30. Further, a coil-shaped return spring 23 that biases the valve member 15 in the direction to close the valve seat 14 is provided between a spring seat 22 on the back face of the valve member 15 and a seat plate 32 abutted to the partition wall 31, and an expandable bellows 24 is provided on the back face of the valve member 15 so as to surround the valve shaft 20 and the return spring 23, so as to isolate the valve shaft 20 from the flow path 13.

The cylinder housing 30 in the fluid pressure driving unit 2 includes the partition wall 31 integrally formed therewith and a cylinder hole 33, in which the piston 16 is accommodated so as to slide via a seal member 34, and a pressure-receiving chamber 37 is defined between the piston 16 and the partition wall 31, the pressure-receiving chamber 37 being connected to a pilot port 38 opening on the side face of the cylinder housing 30, and a chamber 39 on the opposite side of the piston 16 is open to outside.

Although the valve shaft 20 in the fluid pressure driving unit 2 of the vacuum pressure regulating valve is driven by the piston 16 attached to the distal end portion of the valve shaft 20, the fluid pressure driving unit 2 may include, instead of the piston 16 slidably inserted in the cylinder hole 33, a pressure-receiving member such as a bellofram or a bellows, so as to constitute the pressure-receiving chamber 37 in which the pressure-receiving member generates a fluid pressure in the direction to open the valve member 15, and the pilot port 38 for supplying and discharging the pilot fluid to and from the pressure-receiving chamber 37 may be opened.

The valve aperture adjusting unit 3 is incorporated in a cover block 40 coupled to the end portion of the cylinder housing 30, and includes a cylindrical adjuster 41 retained so as to move in the direction to abut and separate from the piston 16 and having an end portion that contacts the back face of the piston 16, and a rotary-to-linear motion conversion mechanism 47 is provided between the adjuster 41 and a rotary shaft 43 driven to rotate by an output shaft 46 of the electric motor 45 via gears 42a, 42b. The rotary-to-linear motion conversion mechanism 47 serves to convert the rotary motion of the rotary shaft 43 into the linear motion of the adjuster 41, to thereby steplessly move the adjuster 41 back and force in the axial direction of the rotary shaft 43 to a desired position, thus to determine a stopping position of the piston 16.

The electric motor 45 is configured to rotate in both forward and reverse directions, and includes a load detector (not shown) that detects the rotational load of the output shaft 46 and outputs the detection signal to the controller. The load detector may be configured to detect the driving current of the electric motor 45, or whether the detected driving current exceeds a predetermined upper limit or lower limit, and to input such data to the controller.

The electric motor 45 is also provided with an encoder (not shown) that detects the rotation amount thereof. The encoder can serve as a position sensor that detects the position of the piston 16 which opens and closes the valve member 15, and therefore the controller obtains the position of the adjuster 41 according to the output from the encoder. Here, a position sensor for detecting the position of the piston (pressure-receiving member) 16 may be separately provided for inputting the signal indicating the position of the valve member 15 to the controller.

The rotary-to-linear motion conversion mechanism 47, configured to convert the forward and reverse rotary motion of the electric motor 45 into the linear reciprocal motion of the adjuster 41, includes a ball screw that converts the rotary motion of the ball screw shaft 43a of the rotary shaft 43 into the linear motion of a mover (ball screw nut) 51 provided on the adjuster 41. Here, the adjuster 41 and the mover 51 respectively include rotation stoppers 41a, 51a that cause the adjuster 41 and the mover 51 to slide without rotating, and the rotation stoppers 41a, 51a are slidably engaged with a guide shaft 52 located in the cover block 40 parallel to the screw shaft 43a.

The driving mechanism for the adjuster 41 is not limited to the rotary-to-linear motion conversion mechanism 47 including the ball screw, but may be designed as desired provided that the adjuster 41 can be made to linearly move by the rotation of the electric motor 45 and pressed against the back face of the pressure-receiving member such as the piston 16, thus to follow up the movement of the pressure-receiving member.

Referring to FIG. 2, the electromagnetic valve unit 6 is connected between an air pressure source 61 and the pressure-receiving chamber 37 through a conduit line 62, and capable of setting a maximum pressure for operating the piston 16 with a built-in pressure-regulating valve and supplying regulated compressed air to the pressure-receiving chamber 37 through the pilot port 38 under the control of the controller, as well as discharging the air through the pilot port 38 under the control of the controller, thereby setting the pressure-receiving chamber 37 to the regulated pressure. More specifically, the electromagnetic valve unit 6 may include, for example, a 2-port electromagnetic valve for air supply connected to the air pressure source 61 through the pressure-regulating valve and another 2-port electromagnetic valve for discharging having the output end open to the ambient air, the 2-port electromagnetic valves being connected to the pilot port 38. In this case, the 2-port electromagnetic valves are opened and closed according to the control signal from the controller so as to regulate the pressure in the pressure-receiving chamber 37. However, a single 3-position 3-port directional control valve may be employed in place of the 2-port electromagnetic valves. In addition, analog valves may be employed as the 2-port electromagnetic valves for supplying and discharging air, instead of on-off valves.

The output pressure supplied to the pressure-receiving chamber 37 by the pressure-regulating valve is capable of generating a maximum value of the total sum of the acting force of the return spring 23, the acting force based on the pressure in the vacuum chamber 7 exerted on the valve member 15, and the biasing force constantly exerted between the adjuster 41 and the piston 16. Here, it is preferable to determine the biasing force to be constantly exerted between the adjuster 41 and the piston 16 in consideration of factors such as friction in the fluid pressure driving unit 2.

The outline of the function of the controller is receiving the outputs of the load detector and the encoder provided for the electric motor 45, the outputs of the pressure sensor 70 that detects the pressure in the vacuum chamber 7, and the signals indicating the control commands from outside such as the preset pressure, and controlling the electric motor 45 and the electromagnetic valve unit 6 on the basis of the mentioned inputs. In addition to those, the controller also serves to detect, as will be subsequently described, an abnormal state in which the pressure in the vacuum chamber 7 obtained from the pressure sensor 70 when the vacuum chamber 7 is to be evacuated is deviated from the tolerance range of the target pressure, and to announce such abnormality.

Specifically, the controlling operations for the electric motor 45 and the electromagnetic valve unit 6 executed by the controller include the position control, in which the controller supplies a necessary driving current to the electric motor 45 according to the control command to thereby set the adjuster 41 to a predetermined position according to the output from the encoder, and the pilot fluid pressure control in which the controller detects, when driving the electric motor 45 for the position control, whether the rotational load (driving current) of the electric motor 45 according to the pressing force between the adjuster 41 and the piston 16 obtained from the output of the load detector is between the predetermined upper limit and the lower limit, and outputs the control signal to the electromagnetic valve unit 6 so as to supply the pilot fluid pressure to the pressure-receiving chamber 37 for pressing the piston 16 against the adjuster 41 with a force between the upper and the lower limits, in the case where the rotational load deviates from the range between the upper and the lower limits, thereby allowing the electric motor 45 to operate with the piston 16 and the adjuster 41 being pressed against each other with the biasing force between the upper and the lower limits.

Further, the process of detecting whether the driving current supplied to the electric motor 45 is between the predetermined upper limit and the lower limit can be excluded and the pilot fluid pressure supplied to the pressure-receiving chamber 37 can be uniquely determined according to the position of the valve member 15, by measuring in advance, as simple substitution for the pilot fluid pressure control, the acting force of the return spring 23, the acting force based on the pressure in the vacuum chamber 7 exerted on the valve member 15, and the biasing force constantly exerted between the adjuster 41 and the piston (pressure-receiving member) 16 in correlation with the position of the piston 16, and storing these values functionized on the basis of the correlation in the controller. For this purpose, it is preferable that the controller is configured to output, when controlling the position of the adjuster 41, the control signal to the electromagnetic valve unit 6 so as to cause the electromagnetic valve unit 6 to output the fluid pressure according to the position of the piston 16 obtained through the functionization, to the pressure-receiving chamber 37 of the fluid pressure driving unit 2 as pilot fluid pressure.

Accordingly, the pilot fluid pressure supplied to the pressure-receiving chamber 37 corresponds to the total sum of the acting force of the return spring 23 according to the position of the piston 16 determined by the position of the adjuster 41, the acting force based on the pressure in the vacuum chamber 7 exerted on the valve member 15, and the biasing force constantly exerted between the adjuster 41 and the piston 16 (including factors such as friction in the fluid pressure driving unit 2).

The controlling operation of the controller will be described in further details hereunder. The control command including the preset value of the vacuum pressure in the vacuum chamber and the evacuation velocity 2 0 information is inputted to the controller, and the controller supplies, according to the control command, the driving current to the electric motor 45 for driving the adjuster 41 to a predetermined position. Then the electric motor 45 is driven and the encoder attached thereto feeds back the signal indicating the position of the adjuster 41 to the controller, so that the servo mechanism operates so as to stop the electric motor 45 always at the designated position. Even when the position of the adjuster 41 is shifted owing to disturbance from outside or the like, correction is immediately performed so as to reposition the adjuster 41.

The controller also sequentially compares the vacuum pressure detected by the pressure sensor 70 in the vacuum chamber 7 with the target pressure determined according to the velocity information, and drives the electric motor 45 so as to control the position of the adjuster 41 so that the pressure in the vacuum chamber 7 agrees with the target pressure.

The controller also outputs, in order to operate the piston 16 while keeping the piston 16 pressed against the adjuster 41 with a generally constant force, the control signal to the electromagnetic valve unit for supplying or discharging air so as to supply the pilot fluid pressure that generates the force that can cope with the [acting force of the return spring 23+acting force based on the pressure in the vacuum chamber 7 exerted on the valve member+biasing force constantly exerted between the adjuster 41 and the piston 16] to the pressure-receiving chamber 37, according to the position of the piston 16 determined by the position of the adjuster 41.

Accordingly, the piston 16 is driven by the pilot fluid pressure to the position where the piston 16 is pressed against the adjuster 41 with a generally constant force, to be constantly pressed against the adjuster 41 with the biasing force. Such a situation allows the acting force of the return spring 23 and the acting force based on the pressure in the vacuum chamber 7 exerted on the valve member 15 to be offset with the acting force corresponding to the pilot fluid pressure exerted on the piston 16, thereby exempting the electric motor 45 from having a driving force that can cope with the mentioned acting forces and thus enabling a small-sized electric motor 45 having a low output power to be employed. In addition, since the controller controls the operation of the piston 16 while keeping the piston 16 and the adjuster 41 pressed against each other with a generally constant biasing force, the encoder attached to the electric motor 45 to detect the rotation amount thereof can serve as the position sensor that detects the position of the piston 16 that defines the valve aperture.

As described earlier, when the servo mechanism operates the electric motor 45 so as to move the adjuster 41 to a predetermined position, the electric motor 45 is immediately driven for correction in case that the position of the adjuster 41 is shifted owing to disturbance from outside. On the other hand, although the pressing force between the adjuster 41 and the piston 16 varies according to the pressure of the pilot fluid supplied to the pressure-receiving chamber 37 in the fluid pressure driving unit 2, when the electric motor 45 is driven for correction the driving current for the electric motor 45 varies according to the pressing force, and the magnitude of the driving current for the electric motor 45 may be regarded as the magnitude of the disturbance from outside.

Therefore, it is unable to decide whether the piston 16 is pressed against the adjuster 41 in the case where the driving current supplied to the electric motor 45 is below the predetermined lower limit as result of the detection by the controller whether the driving current is in the predetermined range, and therefore a signal to activate the electromagnetic valve for supplying air is outputted, and the pilot fluid pressure is supplied to the pressure-receiving chamber 37 so as to drive the piston 16 in the direction to press the adjuster 41. In contrast, in the case where the driving current for the electric motor 45 exceeds the predetermined upper limit and hence it is decided that an excessive pressing force is imposed, the controller outputs a signal to activate the electromagnetic valve for discharging air, to thereby reduce the pilot fluid pressure in the pressure-receiving chamber 37 thus reducing the pressing force.

In addition, as described earlier, the pilot fluid pressure supplied to the pressure-receiving chamber 37 can be uniquely determined according to the position of the valve member 15, by measuring in advance the acting force of the return spring 23, the acting force based on the pressure in the vacuum chamber 7 exerted on the valve member 15, and the biasing force constantly exerted between the adjuster 41 and the piston 16, and storing in the controller these values functionized on the basis of the correlation between the position of the piston 16 and the acting force, and therefore generally the same effect can be attained despite the process of detecting whether the driving current supplied to the electric motor 45 exceeds the predetermined upper and lower limits being excluded.

Consequently, the pilot fluid pressure corresponding to the [acting force of the return spring+acting force based on the pressure in the vacuum chamber exerted on the valve member+biasing force constantly exerted between the adjuster and the pressure-receiving member] is constantly supplied to the pressure-receiving chamber 37, so that the piston 16 and the adjuster 41 are pressed against each other with a generally constant biasing force.

Further, as described earlier, since the controller operates the piston 16 while keeping the piston 16 and the adjuster 41 in the fluid pressure driving unit 2 pressed against each other with a generally constant force, the encoder attached to the electric motor 45 can serve as the position sensor for the piston 16 that determines the aperture of the valve member 15. Such a configuration enables the controller to recognize the position of the piston 16 or the valve member 15 without the need to provide a known linear sensor or the like in the fluid pressure driving unit 2, thereby significantly simplifying the structure. As a matter of fact, however, a known linear sensor or the like may be provided in the fluid pressure driving unit 2 to utilize as the position sensor.

In the aforementioned vacuum pressure regulation system, the controller outputs, as described above, the control signal for properly setting the aperture of the valve member 15 to the electric motor 45 when performing the feedback control of the vacuum pressure in the vacuum chamber 7 through comparison between the pressure signal of the actual pressure output from the pressure sensor 70 and the target pressure. In this process, it is preferable to store in the controller in advance, as velocity information, the preset evacuation velocity (transition velocity of vacuum pressure) and the preset acceleration (acceleration of the transition velocity of vacuum pressure), and to give the controller the control function described hereunder referring to FIG. 3.

Figure 3:
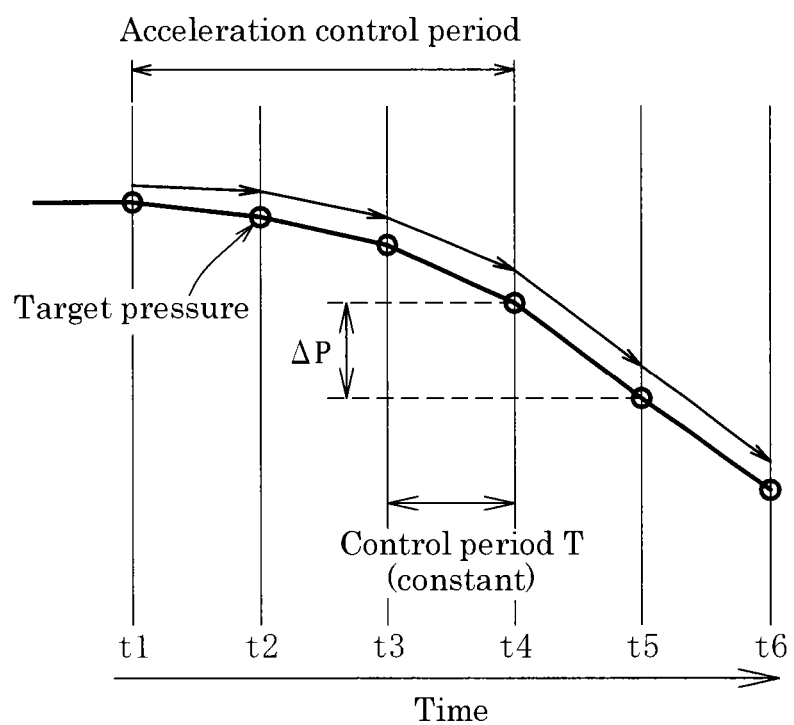
FIG. 3 is a schematic diagram for explaining a control process of vacuum pressure transition according to the present invention.

The controller possessing the preset velocity and the preset acceleration repeats, immediately after the start of the controlling operation at a time point t1 in FIG. 3, the operation of slowly increasing the transition velocity of the vacuum pressure in each control period T (constant) according to the preset acceleration and setting the next target pressure, in other words repeatedly calculates the target pressure for the current control period T on the basis of the actual pressure detected by the pressure sensor 70 and the preset acceleration of the previous control period. As a result, an abrupt change in evacuation velocity in the vacuum chamber 7 can be suppressed, and the evacuation can be gently started. Thereafter, the transition velocity of the vacuum pressure reaches the preset velocity because of the accumulation of the transition according to the preset acceleration through an acceleration control period between t1 and t4 including a certain number of control periods determined by various conditions, and therefore it is preferable to maintain, after the time point t4 beyond the acceleration control period, the preset velocity that reduces the pressure by ΔP (constant) in each control period T.

Figure 5:
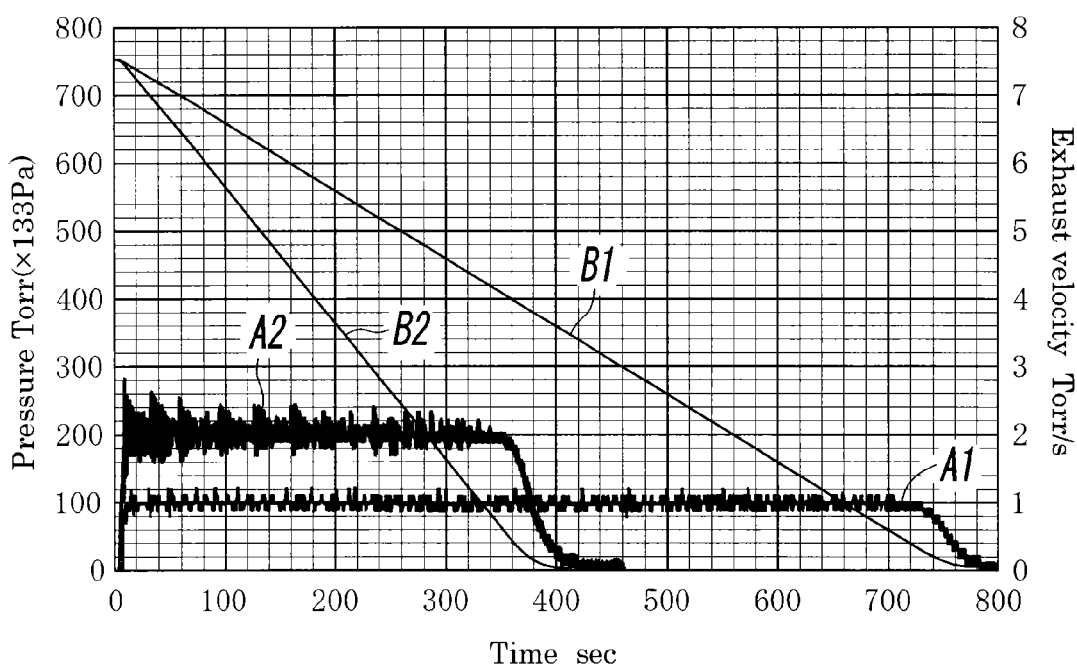
FIG. 5 is a graph showing a monitoring result of exhaust gas characteristics (exhaust velocity and pressure in the vacuum chamber) with respect to an embodiment of the vacuum pressure regulating valve according to the present invention.

The transition of the vacuum pressure is controlled through the control of the position of the adjuster 41 set by the electric motor 45, by internally calculating the position of the adjuster 41 corresponding to the target pressure on the basis of the change in pressure obtained from the calculation in the controller. The position control with the electric motor 45 contains less non-linear elements originating from compressibility of air compared with the air pressure control and, as described earlier referring to FIG. 5, in the case of controlling the rotational load of the electric motor to maintain in the generally constant range between the predetermined upper limit and the lower limit, the exhaust velocity can be relatively accurately performed by controlling the position of the adjuster 41. Further, in the case of measuring in advance the acting force of the return spring and so forth and storing in the controller the values functionized on the basis of the correlation between the position of the piston 16 and the acting force, the rotational load of the electric motor can be similarly controlled in a constant range.

Thus, controlling as above the minute displacement of the adjuster 41 with the electric motor 45 from immediately after the start of the controlling operation suppresses an abrupt change in pressure and allows the degree of vacuum to be increased stably and smoothly.

When the evacuation control is performed as above by the vacuum pressure regulating valve employed in the vacuum pressure regulation system, it is nearly impossible to perfectly prevent a situation where the valve aperture becomes uncontrollable owing to some kind of abnormality in the system, and the desired the exhaust velocity is unable to attain in the vacuum chamber 7. To avoid such a situation, the vacuum pressure regulation system utilizes the controller that controls the aperture of the vacuum pressure regulating valve, to continuously detect the abnormality while performing the evacuation control, with the simple configuration.

Figure 4:
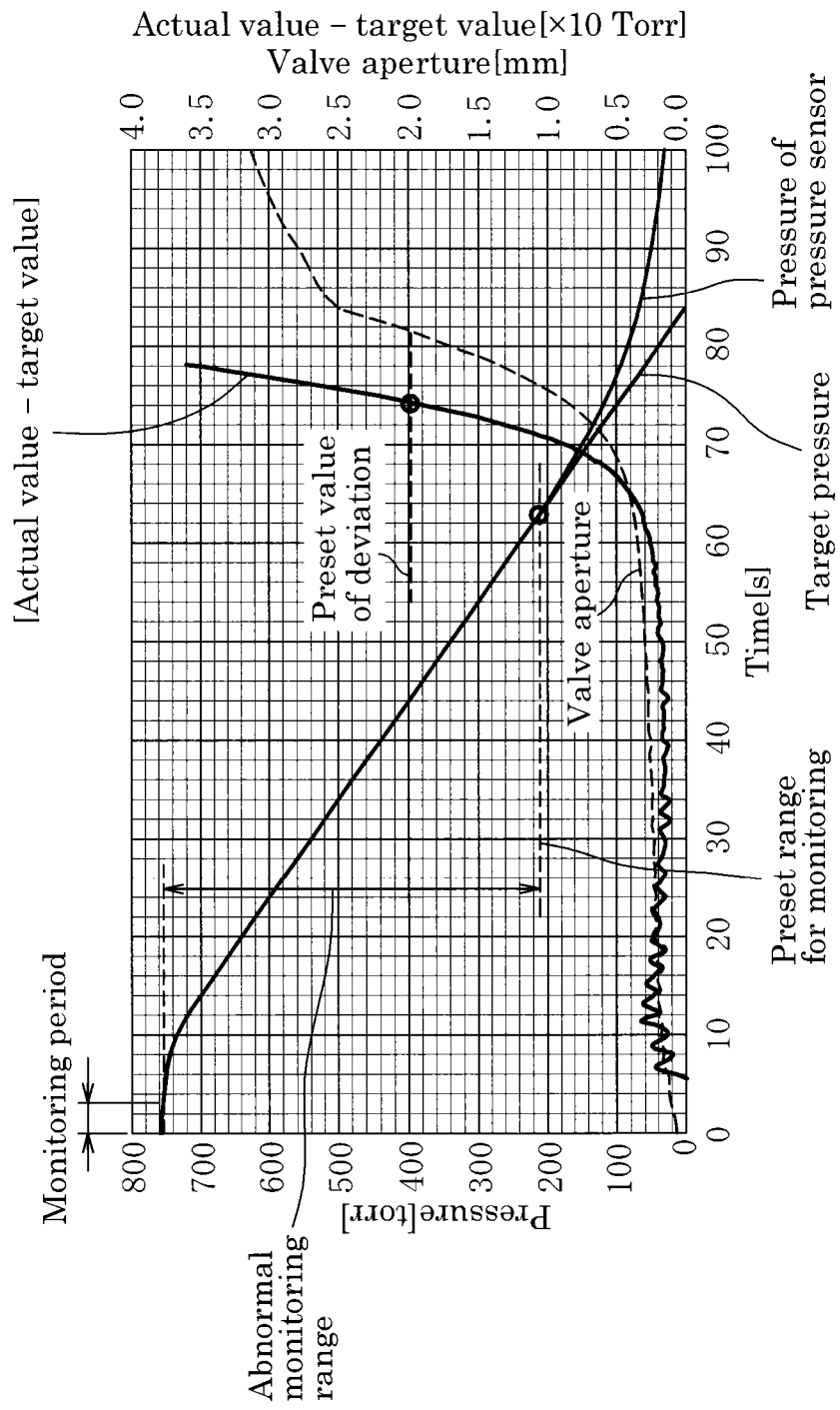
FIG. 4 is a graph showing transition with time of pressure of a vacuum chamber and valve aperture, for explaining an evacuation control and abnormality detection of exhaust gas performed by the vacuum pressure regulation system according to the present invention.

Referring now to FIG. 4, the evacuation control and a detection example of the exhaust gas abnormality by the controller will be described hereunder. FIG. 4 illustrates the transition with time of the pressure in the vacuum chamber 7 and the valve aperture, for explanation of the evacuation control and the detection example of the exhaust gas abnormality. To start the evacuation control, first a short monitoring period is specified after the start of the evacuation. In the case where a predetermined pressure transition (for example, 0.5 Torr) is unable to observe in the vacuum chamber 7 during the monitoring period because, for example, the vacuum pump 8 is unactivated, a maintenance work is performed on the assumption that an error has occurred. In the case where the pressure transition is confirmed, the periodical action for the evacuation control is started as described earlier referring to FIG. 3, the feedback control of the aperture of the valve member 15 is performed on the basis of the position control of the piston 16 in which the target pressure determined from the preset value of pressure and the evacuation velocity information is attained in the vacuum chamber 7 in each control period T, and the preset velocity is maintained after passing through the acceleration control period.

Further, in the evacuation control the controller detects, in each control period, the difference between the actual pressure in the vacuum chamber 7 obtained from the pressure sensor 70 and the target pressure [actual value–target value] (right vertical coordinate axis), and activates an alert device for announcing abnormality of the exhaust gas in the case where the difference exceeds the tolerance range of the pressure difference specified with respect to the target pressure [preset value of deviation], in other words when it is decided that the valve aperture currently controlled is unable to maintain the desired exhaust velocity. Such an arrangement enables the monitoring of the situation where the pressure in the vacuum chamber 7 fails to drop during the evacuation control, owing to abnormality such as leak in the vacuum chamber 7 or other vacuum systems.

In addition, the monitoring whether the difference between the actual pressure and the target pressure exceeds an externally specified preset value of deviation is performed within an externally specified preset range for monitoring with respect to the pressure in the vacuum chamber, from the start of the evacuation control.

Although the embodiment of the vacuum pressure regulation system has been described in details as above, it is to be understood that the present invention is in no way limited to the foregoing embodiment, but may be modified in various manners within the scope and the spirit of the present invention set forth in the appended claims.

The invention claimed is:

1. A vacuum pressure regulation system comprising:
 a vacuum pressure regulating valve including
 a valve main body including, inside a valve housing in which a valve seat is provided in a flow path connecting between a vacuum chamber and a vacuum pump,
  a valve member configured to abut and separate from the valve seat so as to close and open the flow path,
  a valve shaft connected to the valve member and extending in an axial direction thereof from the valve housing such that a distal end portion reaches a fluid pressure driving unit, and
  a return spring that biases the valve member in a direction to close the valve seat;
 a pressure-receiving chamber configured to supply a fluid pressure acting in a direction to open the valve member and including a pressure-receiving member attached to the distal end portion of the valve shaft; and
 the fluid pressure driving unit including a pilot port for supplying and discharging a pilot fluid to and from the pressure-receiving chamber,
 the system also comprising:
 an electromagnetic valve unit connected to the vacuum pressure regulating valve and configured to supply and discharge the pilot fluid through the pilot port of the pressure-receiving chamber; and
 a controller that controls operation of the electromagnetic valve unit on the basis of an output signal from a position sensor that detects a position of the valve member, an output signal from a pressure sensor in the vacuum chamber that detects the vacuum pressure, and a control command inputted from outside,
 wherein the controller possesses a preset value of pressure in the vacuum chamber evacuated by the vacuum pump and velocity information of the evacuation,
 the controller executes feedback control of the aperture of the valve member by controlling the position of the pressure-receiving member, such that the vacuum chamber attains a target pressure determined on the basis of the preset value of pressure and the velocity information of the evacuation in each period of the evacuation control, and
 the controller detects a difference between an actual pressure in the vacuum chamber obtained by the pressure sensor and the target pressure in each control period, to thereby announce abnormality in the case where the difference deviates from a tolerance range specified with respect to the target pressure.

2. The vacuum pressure regulation system according to claim 1,
 wherein the controller is configured to start each period of the evacuation control after a monitoring period for confirming a pressure transition in the vacuum chamber caused by the evacuation of the vacuum chamber has elapsed.

3. The vacuum pressure regulation system according to claim 1,
wherein the controller possesses information of a preset velocity and preset acceleration as part of the velocity information of the evacuation by the vacuum pump, and is configured to slowly increase a transition velocity of the vacuum pressure in each control period according to the preset acceleration after the start of the evacuation control, and to maintain the preset velocity after the transition velocity of the vacuum pressure reaches the preset velocity through an acceleration control period in which the evacuation of the vacuum chamber is gently started.

4. The vacuum pressure regulation system according to claim 1,
wherein the vacuum pressure regulating valve further includes a valve aperture adjusting unit including an adjuster to be made to abut a back face of the pressure-receiving member to determine a stopping position of the pressure-receiving member, and an electric motor that steplessly moves the adjuster back and forth to a desired position by using a rotary-to-linear motion conversion mechanism, and
the controller is configured to control a position of the adjuster by supplying a necessary driving current to the electric motor according to the control command, and controlling operations of the electric motor and the electromagnetic valve unit such that the position of the adjuster determined by an output of an encoder that detects a rotation amount of the electric motor agrees with a designated position.

5. The vacuum pressure regulation system according to claim 4,
wherein the electric motor includes a load detector that detects a rotational load of the electric motor, and
the controller is configured to perform a pilot fluid pressure control including detecting, when controlling the position of the adjuster, whether the rotational load of the electric motor according to a pressing force between the adjuster and the pressure-receiving member obtained from the output of the load detector is between a predetermined upper limit and a lower limit, and outputting a control signal to the electromagnetic valve unit so as to supply a pilot fluid pressure to the pressure-receiving chamber for pressing the pressure-receiving member against the adjuster with a force between the upper and the lower limits in the case where the rotational load deviates from the range between the upper and the lower limits, thereby allowing the electric motor to operate while keeping the pressure-receiving member and the adjuster pressed against each other with the force between the upper and the lower limits.

6. The vacuum pressure regulation system according to claim 5,
wherein the pilot fluid pressure in the pilot fluid pressure control is determined so as to generate a pressing force corresponding to the total sum of an acting force of the return spring, an acting force based on the pressure in the vacuum chamber exerted on the valve member, and an biasing force constantly exerted between the adjuster and the pressure-receiving member.

7. The vacuum pressure regulation system according to claim 4,
wherein the controller possesses predetermined values of an acting force of the return spring, an acting force based on the pressure in the vacuum chamber exerted on the valve member, and a biasing force constantly exerted between the adjuster and the pressure-receiving member, the values being functionized on the basis of a correlation with the position of the pressure-receiving member, and
the controller is configured to output, when controlling the position of the adjuster, a control signal to the electromagnetic valve unit so as to cause the electromagnetic valve unit to output the fluid pressure according to the position of the pressure-receiving member obtained through the functionization, to the pressure-receiving chamber of the fluid pressure driving unit as pilot fluid pressure.

* * * * *